US012206638B2

(12) United States Patent
Liu

(10) Patent No.: US 12,206,638 B2
(45) Date of Patent: Jan. 21, 2025

(54) MESSAGE MANAGEMENT METHOD BASED ON TIME AND LOCATION

(71) Applicant: Gamania Digital Entertainment Co., Ltd., Taipei (TW)

(72) Inventor: Po-Yuan Liu, Taipei (TW)

(73) Assignee: GAMANIA DIGITAL ENTERTAINMENT CO., LTD., Taipei (TW)

( * ) Notice: Subject to any disclaimer, the term of this patent is extended or adjusted under 35 U.S.C. 154(b) by 0 days.

(21) Appl. No.: 17/801,875

(22) PCT Filed: Mar. 9, 2020

(86) PCT No.: PCT/CN2020/078404
§ 371 (c)(1),
(2) Date: Aug. 24, 2022

(87) PCT Pub. No.: WO2021/179115
PCT Pub. Date: Sep. 16, 2021

(65) Prior Publication Data
US 2023/0109682 A1    Apr. 13, 2023

(51) Int. Cl.
*H04L 51/222* (2022.01)
*G01S 19/01* (2010.01)
(Continued)

(52) U.S. Cl.
CPC ............ *H04L 51/222* (2022.05); *G01S 19/01* (2013.01); *H04L 51/063* (2013.01); *H04L 51/224* (2022.05)

(58) Field of Classification Search
CPC ... H04L 51/222; H04L 51/063; H04L 51/224; G01S 19/01; H04W 4/21; H04W 88/184; H04W 4/02; H04W 4/12
See application file for complete search history.

(56) References Cited

U.S. PATENT DOCUMENTS 10,529,139 B1 * 1/2020 Greene ................... G06T 13/40
2002/0016171 A1   2/2002 Doganata et al.
(Continued)

FOREIGN PATENT DOCUMENTS

CN   101730006 A   6/2010
CN   106708353 A   5/2017
(Continued)

*Primary Examiner* — Austin J Moreau
(74) *Attorney, Agent, or Firm* — MUNCY, GEISSLER, OLDS & LOWE, P.C.

(57) ABSTRACT

A message management method based on time and location is applied to the network system. Comprises obtaining a user account, a location information and a time information through an electronic device, and transferring the user account, the location information and the time information to a message server; obtaining a geographic information from a map database based on the location information, and displaying a region of the geographic information on a display of the electronic device; and in a display page of the display, using the user account, the time information and the region as a filter condition, obtaining a name, an avatar of a relevant user from a user database, and obtaining a message of the relevant user from a message database, and displaying the name, avatar and message of the relevant user on the display page according to the sending location of the message.

4 Claims, 8 Drawing Sheets

(51) Int. Cl.
*H04L 51/063* (2022.01)
*H04L 51/224* (2022.01)

(56) References Cited

U.S. PATENT DOCUMENTS

| | | | | |
|---|---|---|---|---|
| 2002/0156787 | A1* | 10/2002 | Jameson | G06Q 10/10 |
| 2014/0129559 | A1* | 5/2014 | Estes | G06Q 10/10 |
| | | | | 707/737 |
| 2015/0245168 | A1* | 8/2015 | Martin | H04W 4/029 |
| | | | | 715/751 |
| 2018/0316804 | A1* | 11/2018 | Reina | H04N 1/00228 |
| 2021/0109645 | A1* | 4/2021 | Kan | G06F 16/487 |

FOREIGN PATENT DOCUMENTS

| | | |
|---|---|---|
| CN | 104468679 B | 3/2018 |
| CN | 109905315 A | 6/2019 |
| CN | 110809248 A | 2/2020 |
| CN | 110839105 A | 2/2020 |

* cited by examiner

MESSAGE MANAGEMENT METHOD BASED ON TIME AND LOCATION

FIELD OF THE INVENTION

The present invention relates generally to message management in a network system, and more particularly to a time and location based message management method for application in a network system.

BACKGROUND OF INVENTION

In the recent years, smart phones have become a must-have product for modern people because of their more and more upgraded functions and popularity. The multiple functions of smart phones are frequently used in daily life. For example, a typical function of common smart phones is access to the Internet. Users can use smart phones to surf the Internet. Also, users can execute the network communication applications installed in their smart phones to conduct online communication, to send messages or voices to their friends or to a specific group.

Generally, a network communication application allows a user to send messages in real time. That is to say, when a user sends a message to a specific user, the specific user can receive the message immediately, and the messages received are displayed in a time-based order. In some cases, a user may need to schedule a specific time to send a message to a specific user, or plan to send a message to a specific user only when the user is at a specific location. Such functions cannot be realized using the existing network communication applications or technologies.

On the other hand, network communication applications allow users to search a message sent by a specific user at a specific time. However, when the user wants to search messages sent by different users at a specific time, the user must enter each chatroom one by one and repeatedly scroll the timeline to search the messages. Such procedures are quite tedious and frustrating for users.

SUMMARY OF THE INVENTION

In view of this, the present invention provides a time and location based message management method to realize message searching based on time and location, and users can send a message to each other at a preset time and location, so that the user can receive the corresponding message at a specific time and at a specific location.

The present invention a embodiment, a time and location based message management method for application in a network system. The network system includes at an electronic device and a message server, the electronic device can access the message server through the Internet, the message server comprises a map database, a user database, and a message database, the message database stores a plurality of data, each data including such information as sender, sending time and sending location. Firstly, an electronic device is used to obtain a user account number, a location data and a time data, to send the user account number, the location data and the time data to the message server. Then, based on the location data, a map data is obtained from the map database of the message server, and an area range of the map data is displayed on the screen of the electronic device. After that, on the screen page of the display, using the user account number, the time data and the area range as the screening conditions, a name of the related user and an avatar of the related user are obtained from the user database of the message server, and a data of the related user is obtained from the message database of the message server, based on the sending location of the messages, the names, avatars and messages of the related users can be collectively displayed on the screen page of the display.

In some embodiments, the screen page can include a timeline to select the time data. Based on the selected time data, the messages whose sending time falls within the range of the time data can be obtained from the message database.

In some embodiments, the location data is obtained through the GPS of the electronic device.

In some embodiments, the messages of the related user are selected, and a confirmation command is sent through the electronic device, the message server receives a confirmation command, to connect the screen page to a message page of the related user and obtain all messages of the related user, and the messages are displayed on the message page through the display of the electronic device.

In some embodiments, when the message server receives the page shifting operating command from the electronic device, the screen changes to the message page of another related user, all messages of this related user are obtained and displayed on the screen of the electronic device.

In some embodiments, the page shifting operating command can include left and right swiping and/or clicking on the preset buttons.

In some embodiments, through the electronic device, a designated message is edited and sent to the message database, specifically, the designated message includes a designated user and a designated location to receive the message. When the designated receiving user is at the designated receiving location, the message database sends the designated message to the designated receiving user.

In some embodiments, when the message server receives the designated message, it can send a notifier to the designated receiving user as a reminder.

In some embodiments, through the electronic device send the event invitation to the message database, specifically, the event invitation at least includes an event location. The message database send a notifier to the related user as a reminder.

DETAILED DESCRIPTION OF THE INVENTION

Embodiment 1

Figure 1:
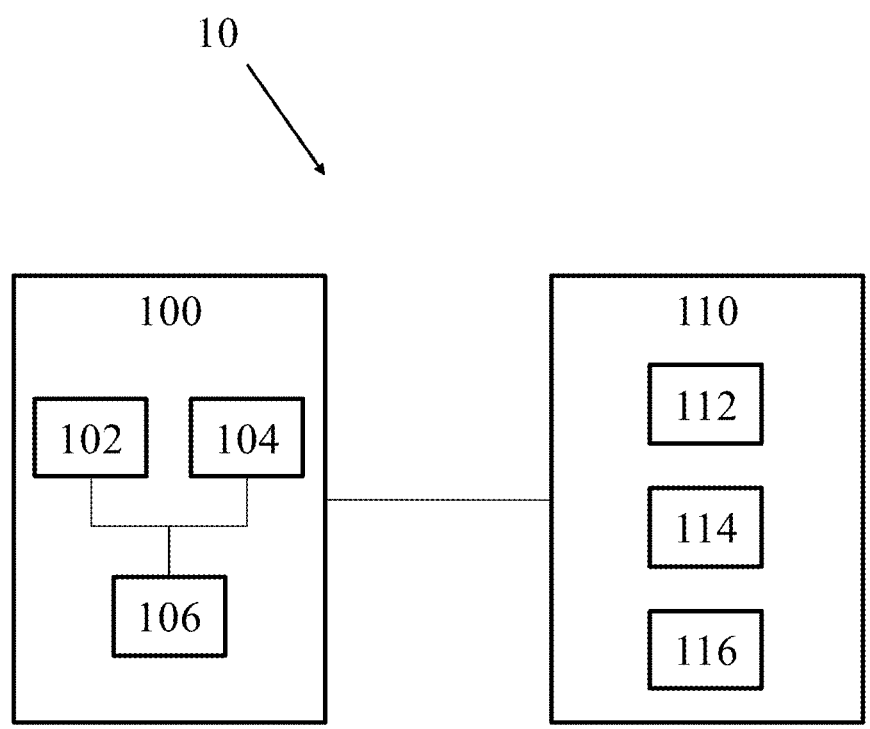
FIG. 1 discloses a schematic view of a network system architecture in which an embodiment of the present invention is applied.

The present invention provides a time and location based message management method for application in a network system. FIG. 1 discloses a schematic view of a network system architecture in which an embodiment of the present invention is applied. As shown in the figure, the network system 10 includes at least one electronic device 100 and a message server 110. The electronic device 100 can access the message server 110 through the Internet. Firstly, an electronic device is used to obtain a user account number, a location data and a time data.

In a preferred embodiment, as shown in the figure, the message server 110 comprises a map database 112, a user database 114, and a message database 116. The map database 112 stores map data of a plurality of areas. The user database 114 stores data about the users, including a list of names, avatars and related users. Related users include but are not limited to friends, relatives, colleagues, or classmates of a specific user. The user database 114 also stores the names and avatars of the related users. The message database 116 stores a plurality of data, each data including such information as sender, sending time and sending location, wherein, the sender data in the message database 116 corresponds to the user data stored in the user database 114. It is to be noted that, the message server 110 can include a processor (not shown in the figure) and a network access interface (not shown in the figure), to control the operation of the message server 110, and to access the Internet.

In a preferred embodiment, as shown in the figure, the electronic device 100 at least includes a display 102, a memory 104 and a processor 106. The display 102 can display the relevant information, such as a screen page. The memory 104 can be used to store an application software program, wherein, the application software program can include a message announcement program. The processor 106 can be electrically connected to the display 102 and the memory 104 respectively, to control the operation of the display 102 and the memory 104 and to execute the application software program. In some embodiments, the electronic device 130 can further include a network access unit (not shown in the figure), to provide network connection for the electronic device 100 to access the Internet. It is to be noted that, in some embodiments, the electronic device 130 can be a personal computer, a tablet computer, a smart phone or a smart bracelet etc. The present invention does not have limitation on the type of the electronic device, nor does it have limitation on the software or hardware installed in the electronic device.

Figure 2:
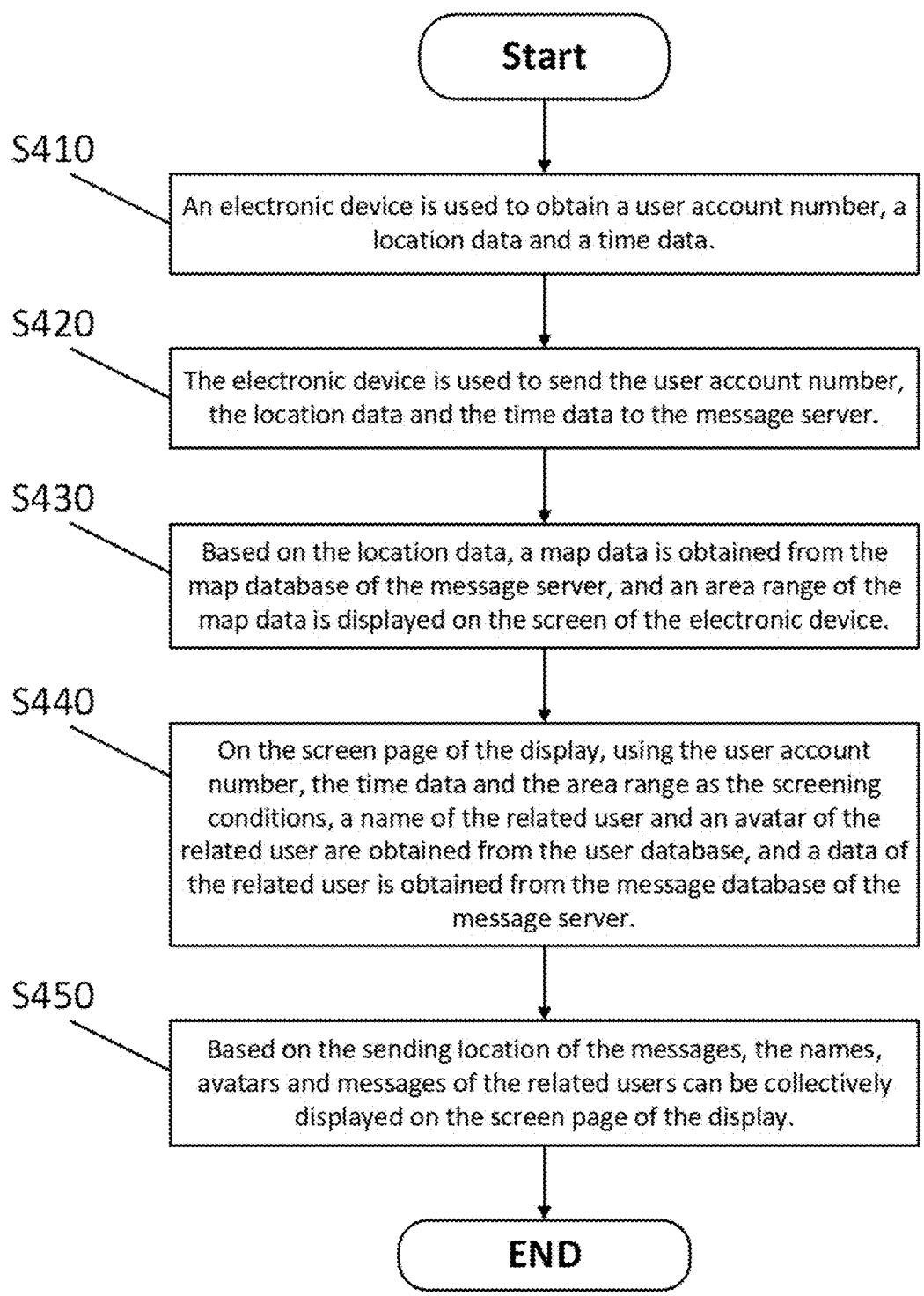
FIG. 2 discloses a flow chart of the time and location based message management method according to the embodiment of the present invention.

FIG. 2 discloses a flow chart of the time and location based message management method according to the embodiment of the present invention. Firstly, as indicated in Step S410, an electronic device is used to obtain a user account number, a location data and a time data. In some embodiments, the electronic device can install and execute an application software program. The application software program can record the user account number. The application software program includes a message announcement program. It is to be noted that, in some embodiments, the location data is obtained through the GPS of the electronic device. The time data can be obtained through the operating system or application software program of the electronic device. As indicated in Step S420, the electronic device is used to send the user account number, the location data and the time data to the message server. Then, as indicated in Step S430, based on the location data, a map data is obtained from the map database of the message server, and an area range of the map data is displayed on the screen of the electronic device. After that, as indicated in Step S440, on the screen page of the display, using the user account number, the time data and the area range as the screening conditions, a name of the related user and an avatar of the related user are obtained from the user database of the message server, and a data of the related user is obtained from the message database of the message server. In some embodiments, the screen page can include a timeline to select the time data. Based on the selected time data, the messages whose sending time falls within the range of the time data can be obtained from the message database. Then, as indicated in Step S450, based on the sending location of the messages, the names, avatars and messages of the related users can be collectively displayed on the screen page of the display.

Embodiment 2

Figure 3:
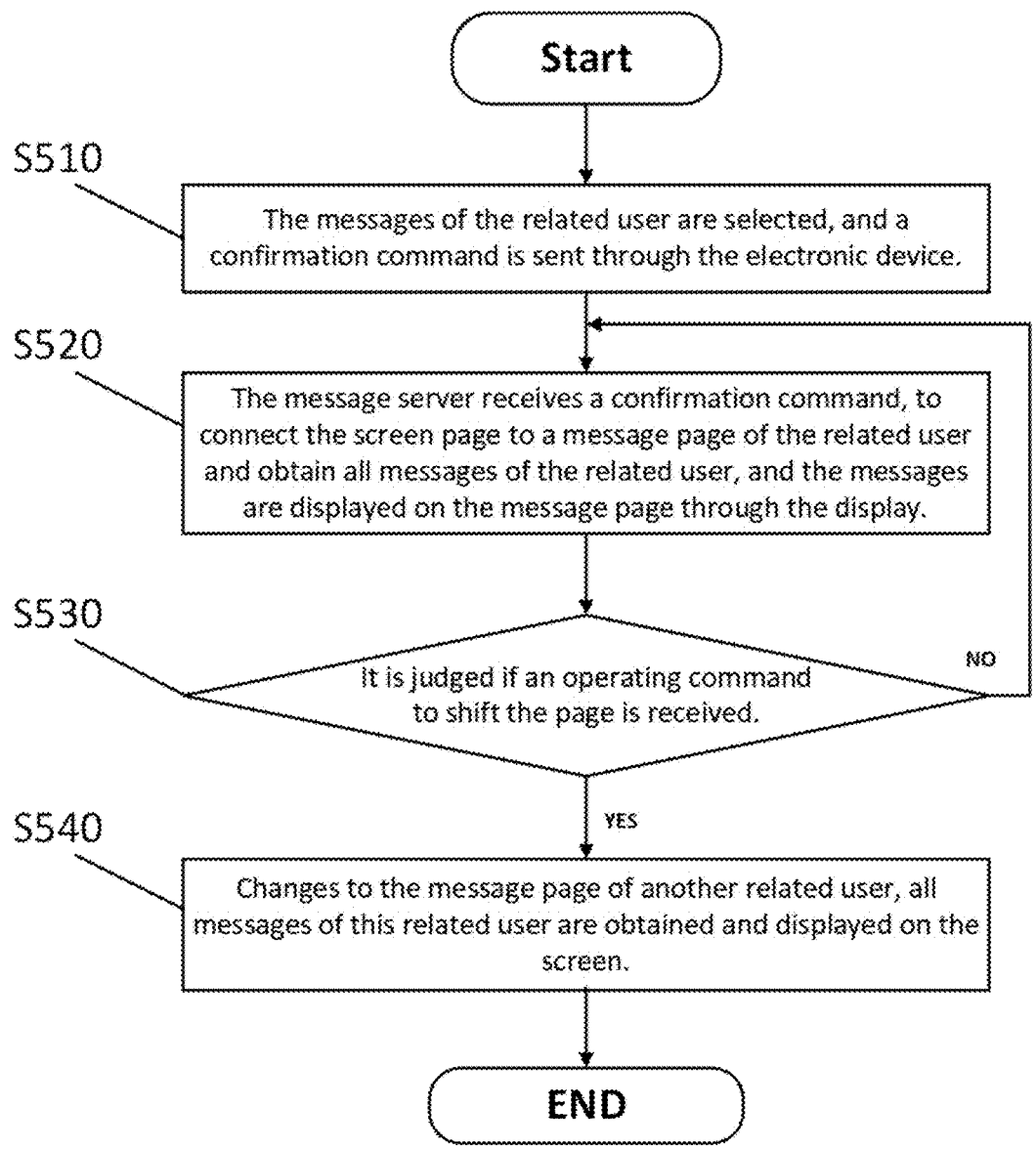
FIG. 3 discloses a flow chart of the time and location based message management method according to another embodiment of the present invention.

FIG. 3 discloses a flow chart of the time and location based message management method according to another embodiment of the present invention. In this embodiment, the user can access the message pages of the related users. Firstly, as indicated in Step S510, on the screen page of the display, the messages of the related user are selected, and a confirmation command is sent through the electronic device. As indicated in Step S520, the message server receives a confirmation command, to connect the screen page to a message page of the related user and obtain all messages of the related user, and the messages are displayed on the message page through the display of the electronic device. Then, as indicated in Step S530, it is judged if an operating command to shift the page is received. It is to be noted that, in some embodiments, the page shifting operating command can include left and right swiping and/or clicking on the preset buttons. If the message server does not receive the page shifting operating command from the electronic device ("No" in Step S530), go back to Step S520. When the message server receives the page shifting operating command from the electronic device ("Yes" in Step S530), as indicated in Step S540, the screen changes to the message page of another related user. All messages of this related user are obtained and displayed on the screen of the electronic device.

Figures 4A, 4B, 4C:
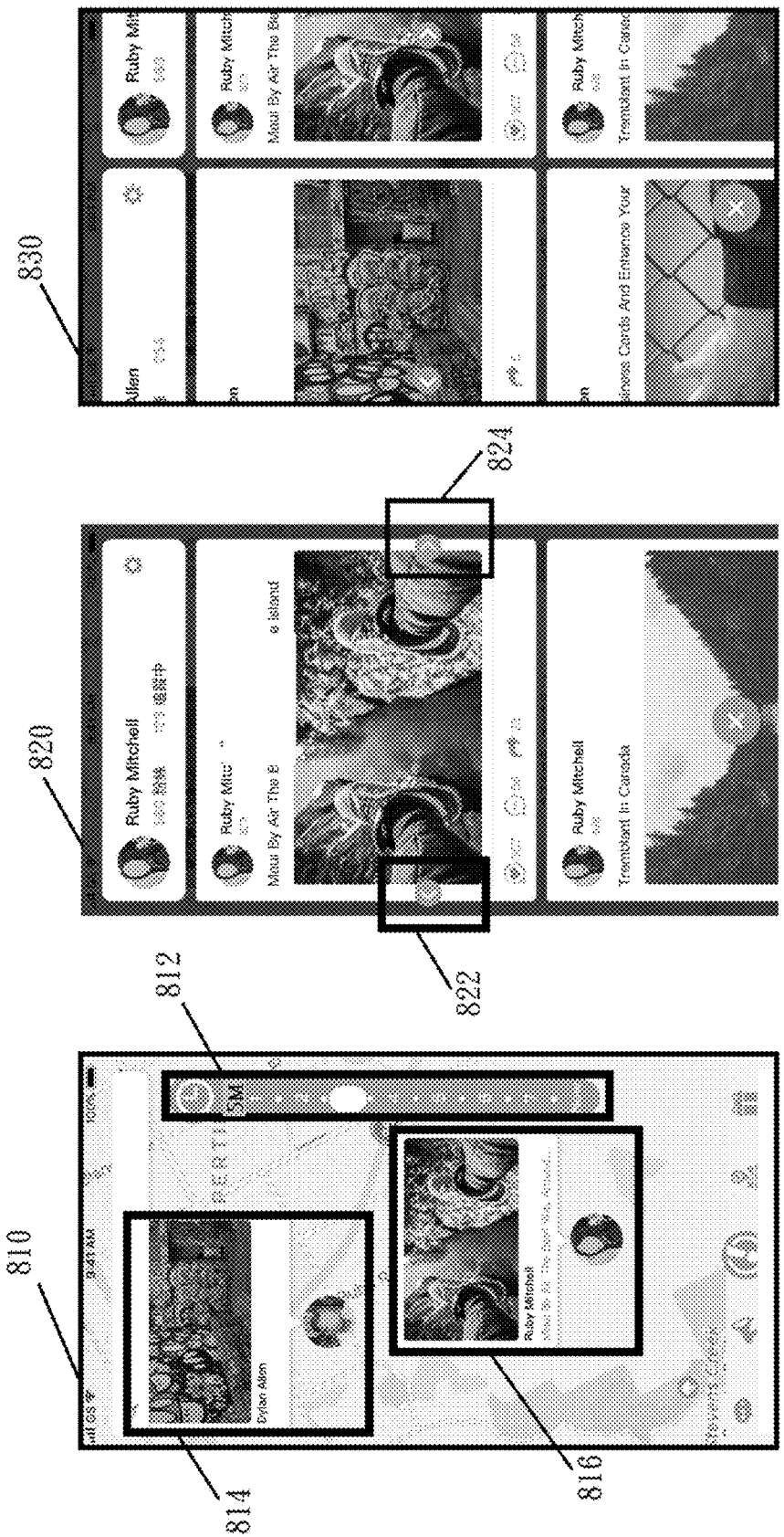
FIG. 4A to FIG. 4C disclose an example of the time and location based message management method according to an embodiment of the present invention.

FIG. 4A to FIG. 4C disclose an example of the time and location based message management method according to an embodiment of the present invention. Based on the location data of the electronic device, a map data can be obtained from the map database of the message server, and displayed on the screen of the electronic device, as shown in the screen page 810 in FIG. 4A. Specifically, the screen page can include a timeline 812. Through the timeline 812, the user can select the time data. Messages and avatars (814, 816) of all related users within the area range meeting the selected time data will be collectively displayed. When the user selects a specific message (such as message 816), the screen page 820 can display all information of the user related to the selected message 816, as shown in FIG. 4B. It is to be noted that, the screen page 820 includes a page shifting operating button (822, 824). When the user clicks the page shifting operating button, the screen page will shift to all information of another related user, as shown in the screen page 830 in FIG. 4C.

Figure 5:
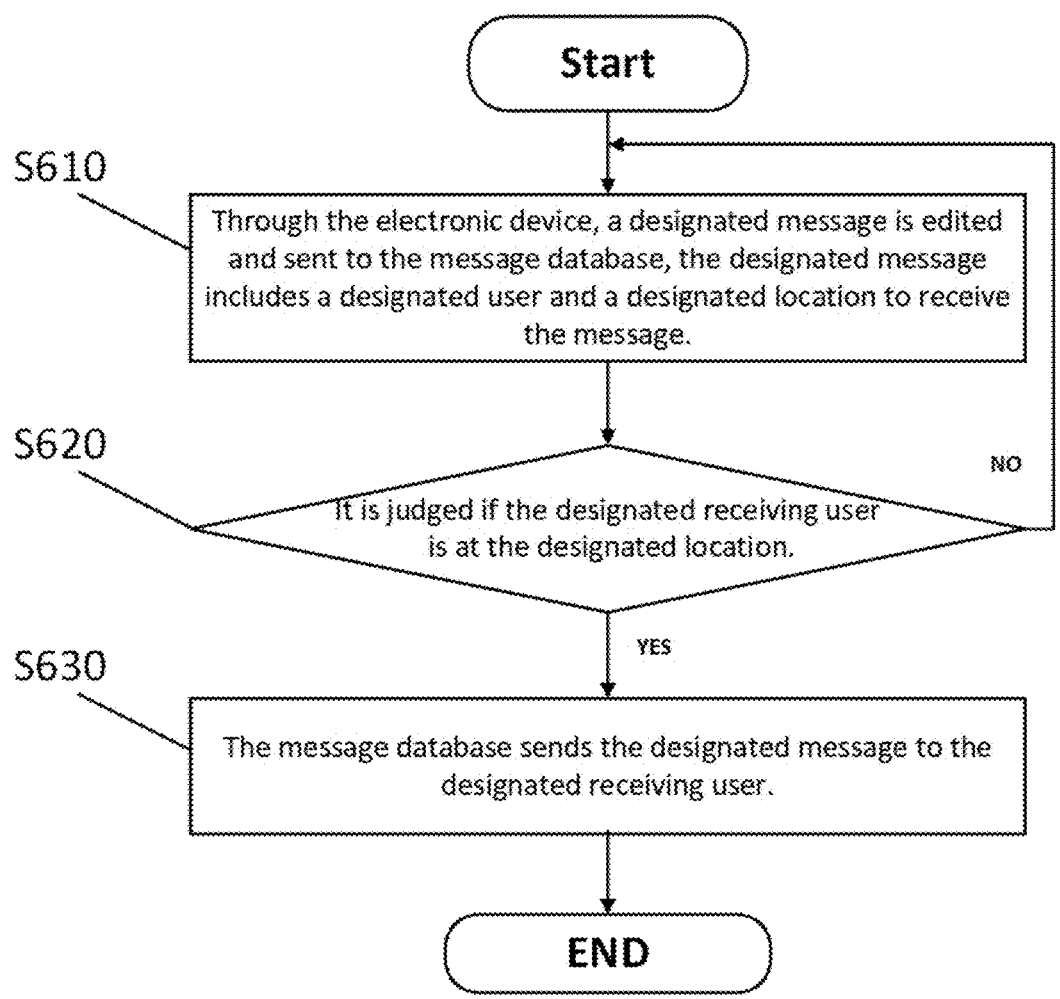
FIG. 5 discloses the flow chart of the method to send future messages according to the preferred embodiment of the present invention.

FIG. 5 discloses the flow chart of the method to send future messages according to the preferred embodiment of the present invention. In this embodiment, the user can edit a future message to a specific user, to be sent only when the specific user is at a specific location. Firstly, as indicated in Step S610, through the electronic device, a designated message is edited and sent to the message database. Specifically, the designated message includes a designated user and a designated location to receive the message. In some embodiments, when the message database of the message server receives the designated message, it can send a notifier to the designated user as a reminder. As indicated in Step S620, it is judged if the designated receiving user is at the designated location. When the designated receiving user is not at the designated location ("No" in Step S620), continue the judgement in Step S620. When the designated receiving user is at the designated receiving location ("Yes" in Step S620), as indicated in Step S630, the message database sends the designated message to the designated receiving user. It is to be noted that, the message server will receive the location data sent by the related user via the electronic device, and will compare it with the designated receiving location, to judge if the designated receiving user is at the designated location.

Figure 6:
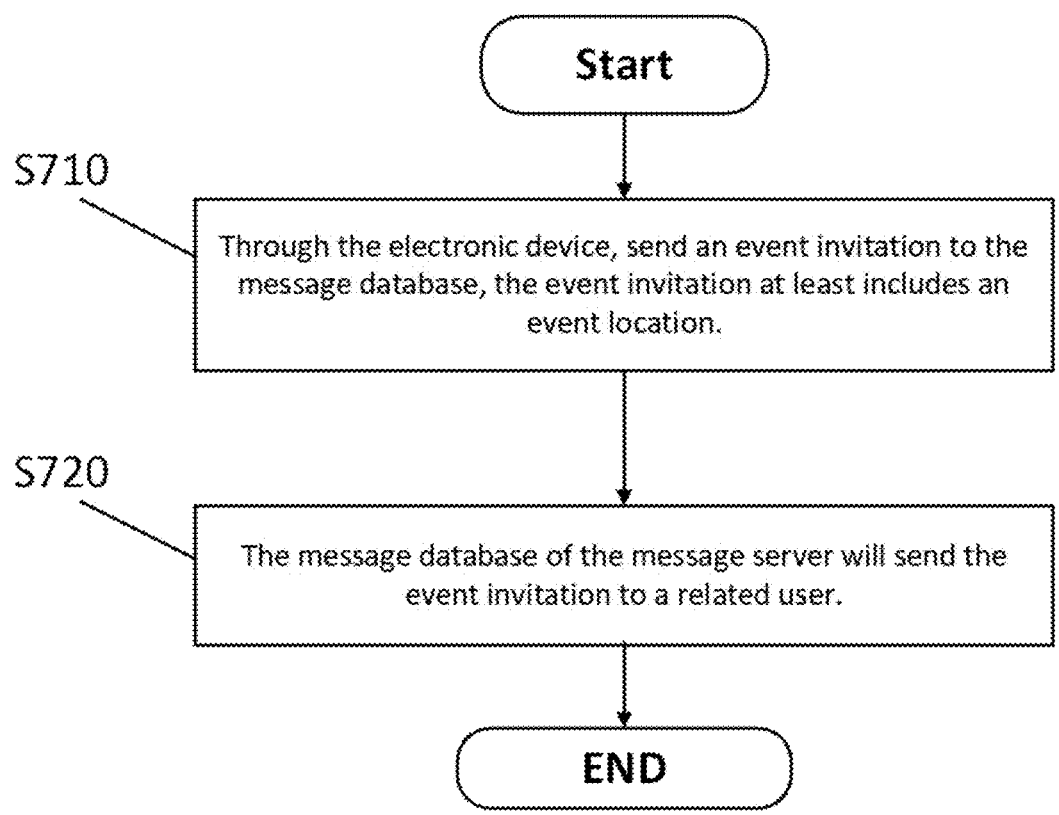
FIG. 6 discloses the flow chart of the method to send an event invitation according to an embodiment of the present invention.

FIG. 6 discloses the flow chart of the method to send an event invitation according to an embodiment of the present invention. In this embodiment, the user can send an invitation to the related user through a message. As indicated in Step S710, through the electronic device, the user can create and send an event invitation to the message database. Specifically, the event invitation at least includes an event location. Then, as indicated in Step S720, the message database of the message server will send the event invitation to a related user. It is to be noted that, in some embodiments, only when the related user is at the location of the event will the message server send the event invitation to the related user. The method to judge if the related user is at the location of event is as disclosed above and is not repeated here.

Embodiment 3

Figure 7:
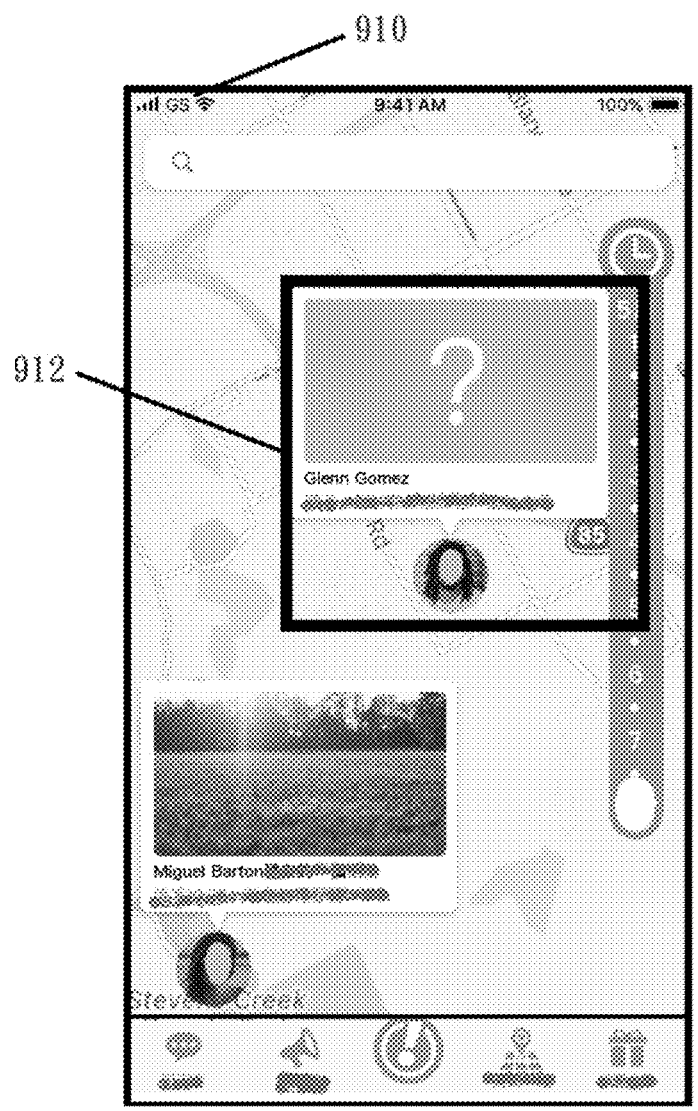
FIG. 7 discloses an example of sending a future message according to the embodiment of the present invention.

FIG. 7 discloses an example of sending a future message according to the embodiment of the present invention. In this embodiment, through the electronic device, the user can edit and send a designated message to the message database. When the message database of the message server receives the designated message, it can send a notifier to the designated receiving user as a reminder, as shown in the screen page 910 in FIG. 7. Specifically, the designated message 912 includes a designated receiving user and a designated receiving location. When the designated receiving user is at the designated receiving location, the message database will send the designated message to the designated receiving user.

Embodiment 4

Figure 8A:
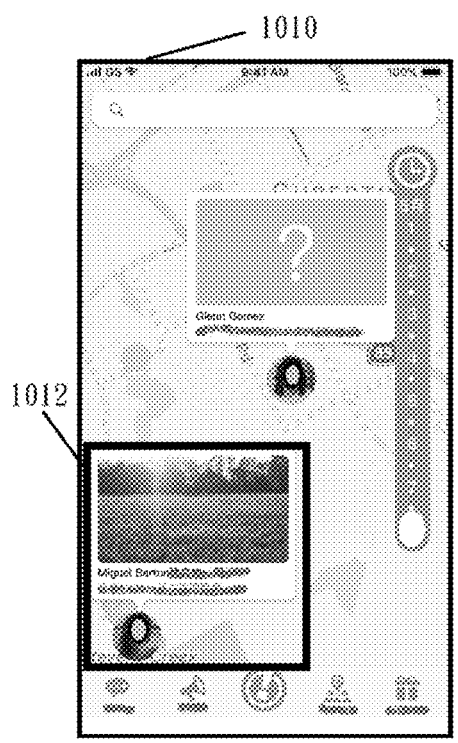
FIG. 8A to FIG. 8B disclose an example to send the event invitation according to an embodiment of the present invention.
Figure 8B:
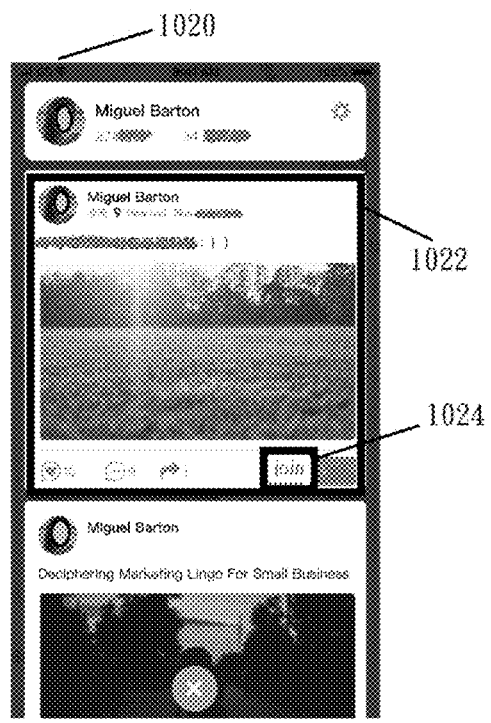

FIG. 8A to FIG. 8B disclose an example to send the event invitation according to an embodiment of the present invention. In this embodiment, through the electronic device, the user can create and send the event invitation to the message database. Specifically, the event invitation at least includes an event location. When the message database of the message server receives the event invitation, it can send a notifier to the related user as a reminder, as shown in the screen page 1010 in FIG. 8A. The screen page 1010 can include related information 1012 of the event. When the user clicks the related information 1012, all information about the event will be displayed on the screen page 1020, as shown in the information 1022 in FIG. 8B. The user can click the "attend" button 1024 to attend the event.

It is to be noted that, the present invention is a social network platform integrating timeline and map, wherein the user can see the news feed of the friends within the range of the map displayed based on the selected time. The present invention uses the timeline as the core element. Based on different time points, the event information at the searched location may be changed. Even if the information is searched on the Internet, the credibility cannot be confirmed due to different time of publication. By using the present invention to select a specific date, the user can see the posts created by friends at this specific date, and therefore can avoid the above problem. For instance, there are different events at a specific sightseeing location in different seasons. Such events are not available on the map. When reading articles shared by other people on the Internet, the time difference may also affect the accuracy of the information. However, through the present invention, the user can see the posts created at a specific date, thus enhancing the credibility of the information.

The invention claimed is:

1. A time and location based message management method, for application in a network system, the network system including an electronic device and a message server, the electronic device accessing the message server via the Internet, the message server including a map database, a user database and a message database, the message database storing a plurality of data, each data including a sender, a sending time and a sending location, the method including:
   obtaining a user account number, a location data and a time data through the electronic device of a receiver;
   sending the user account number, the location data and the time data to the message server;
   based on the location data of the receiver, obtaining a map data from the map database, and selecting to display an area range of the map data on a screen of the electronic device;
   on a screen page displayed, using the user account number, the time data and the area range as screening conditions, obtaining a name of a related user and an avatar of the related user from the user database and obtaining a message of the related user from the message database, and based on the sending location of the message, collectively displaying the name, the avatar and the message of the related user on the screen page, the related users include friends, relatives, colleagues, or classmates of a specific user;
   wherein the screen page includes a timeline for selecting a period of time, based on the selected the period, the messages whose sending time falls within the period are obtained from the message database;
   the sender editing and sending a designated message to the message database via the electronic device, the designated message includes a designated receiving user, a designated receiving time and a designated receiving location, which only the related users of the sender can receive a message left by the sender when present at a specific time and location;
   when the message database receives the designated message, sending a notifier to the designated receiving user as a reminder;

when the designated receiving user is at the designated receiving location at the designated receiving time, the message database sends the designated message to the designated receiving user;

clicking the message of the related user, and through the electronic device, sending a confirmation command, wherein the message server receives the confirmation command, connects the screen page to a message page of the related user, and obtains all messages posted on all places and time periods by the related user and displaying the information on the message page; and when the message server receives a page shifting operating command from the electronic device, shifting to another the message page posted on all places and time periods by the related user and displaying the information on the message page.

2. The time and location based message management method defined in claim 1, wherein the location data is obtained via GPS.

3. The time and location based message management method defined in claim 1, wherein the page shifting operating command includes: left and right swiping and/or clicking the setting button.

4. The time and location based message management method defined in claim 1, which further includes:

through the electronic device, creating and sending an event invitation to the message database, wherein the event invitation includes an event location; and the message database sending the event invitation to the related user.

* * * * *